May 15, 1951 — E. G. BARRETT — 2,552,661
ROTARY ENGINE
Filed June 13, 1949 — 3 Sheets-Sheet 2

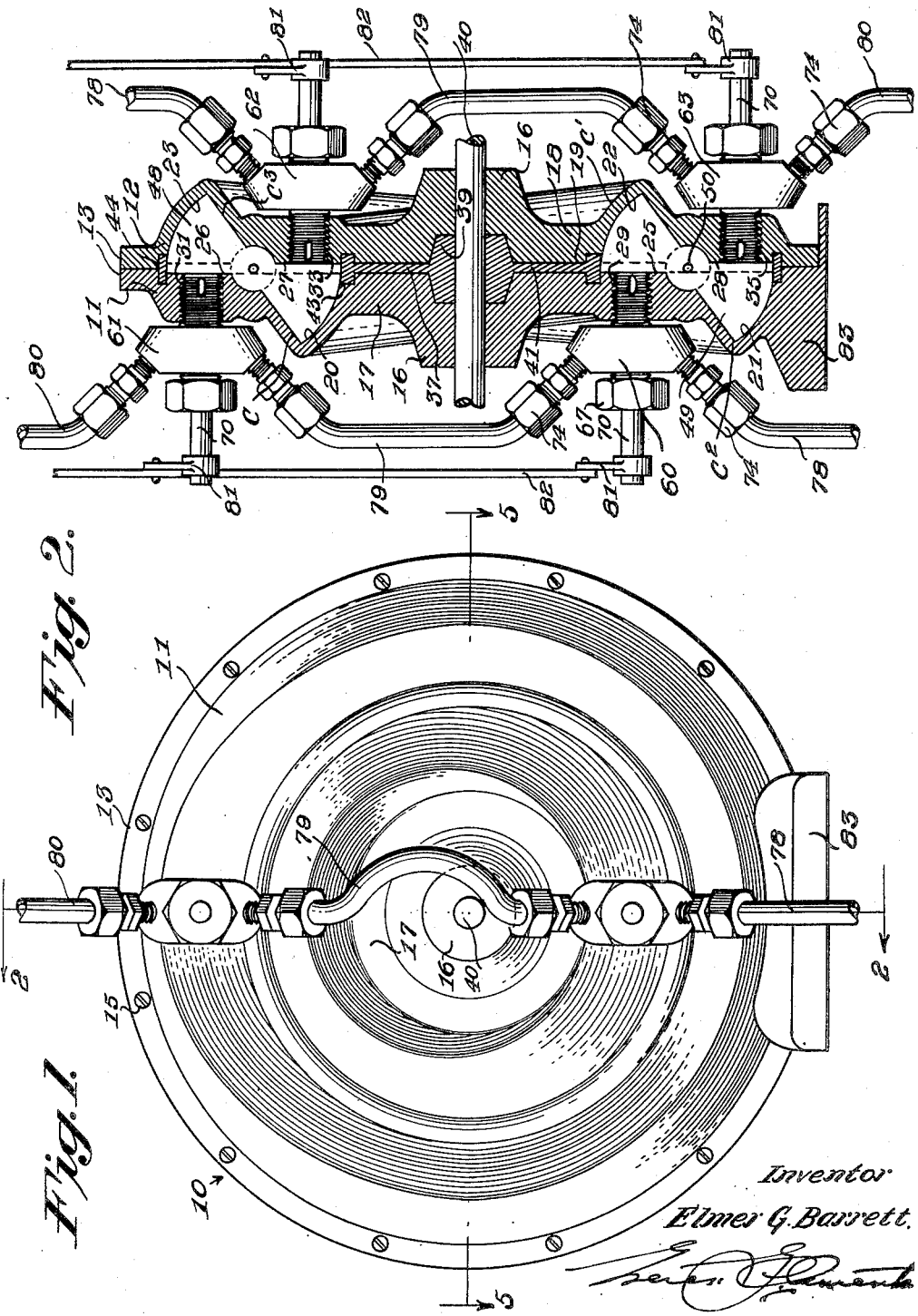

Inventor:
Elmer G. Barrett.
Attorney

May 15, 1951  E. G. BARRETT  2,552,661
ROTARY ENGINE
Filed June 13, 1949  3 Sheets-Sheet 3
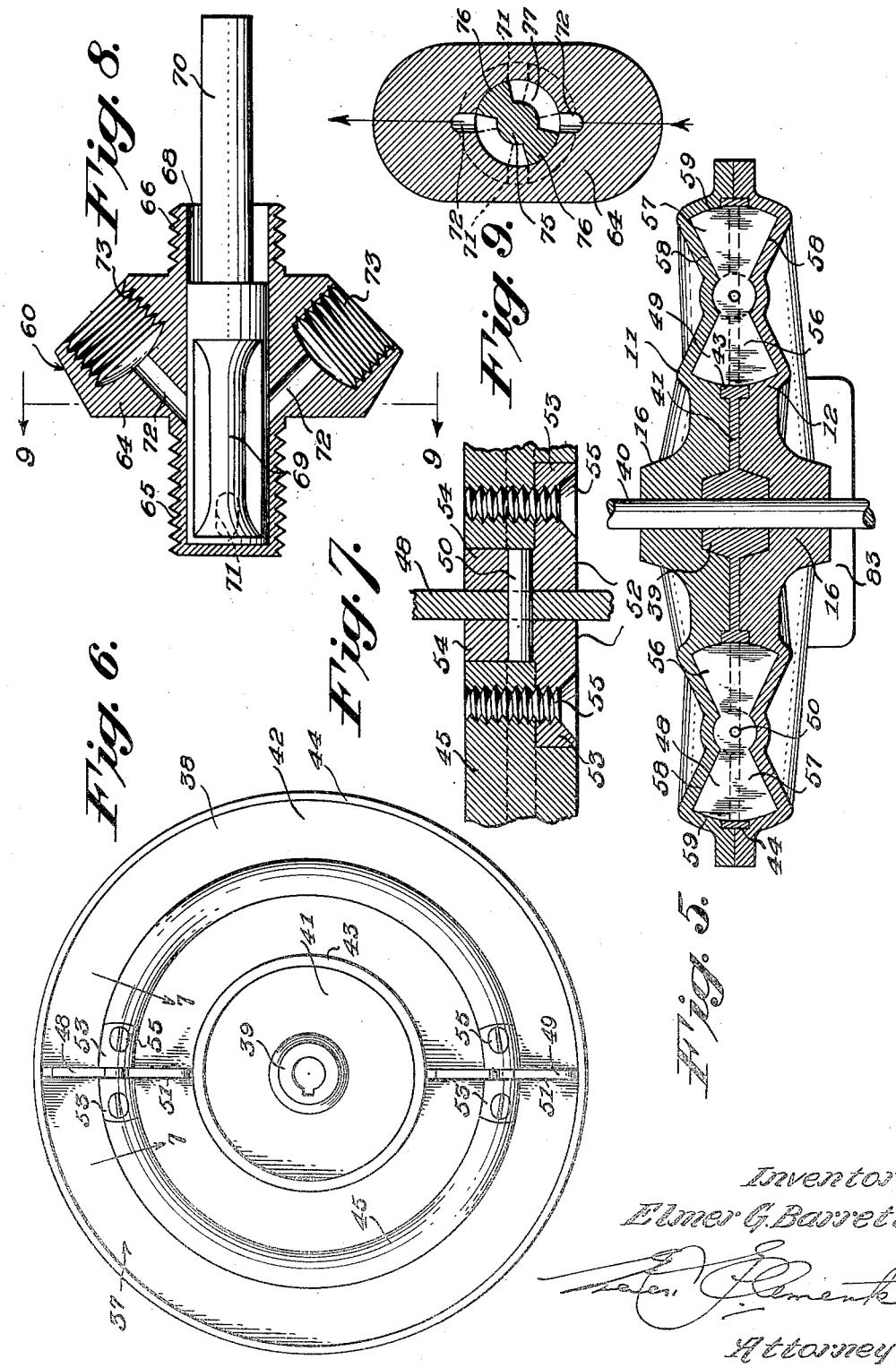
Inventor
Elmer G. Barrett
Attorney Patented May 15, 1951

2,552,661

UNITED STATES PATENT OFFICE 2,552,661

ROTARY ENGINE

Elmer G. Barrett, Pampa, Tex.

Application June 13, 1949, Serial No. 98,862

5 Claims. (Cl. 121—67)

This invention relates to a rotary engine.

The engine, in accordance with the present invention is of that type in which a piston carrying rotor is caused to revolve within a casing by fluid pressure, and particularly steam.

While such prior constructions generally satisfied the requirements of engines of this general character, they were either too bulky and costly in construction and maintenance or they were inefficient in the utilization of fluid pressure energy and the conversion of same into mechanical movements.

It is accordingly an object of this invention to provide a highly efficient rotary engine which is both simple and compact in construction and which is capable of manufacture and operation at relatively low cost.

It is a further object of the invention to provide such a rotary engine having greatly increased operating efficiency, through reduction in friction losses and minimum of operating parts required, such that there is a minimum waste in the conversion of the steam or other working fluid pressure into mechanical movement.

A still further object of the invention is to provide a rotary steam engine including a casing having a disk-form of rotor which is rotatably supported therein and which is provided with oscillatory mounted pistons. The casing is further provided with a plurality of annular steam chambers or cylinders at each side of the rotor which are of substantially 360° extent, the pistons extending transversely through the rotor disk and across two of said chambers for simultaneously cooperating with both chambers at opposite sides of the rotor, and the chambers each extending oppositely from intake and exhaust ports which open close to the rotor disk and from which the chambers are of substantially increasing volume, whereby allowing for rapid steam expansion and a resulting maximum efficiency thereof.

Other objects and advantages of the invention will become apparent in the course of the following detailed description, taken in connection with the accompanying drawings, and wherein—

Fig. 1 is a side elevational view of the improved engine in accordance with a preferred structural embodiment thereof, the valve actuating means being omitted in order to show the valves and steam conduits in full view.

Fig. 2 is a vertical transverse section substantially in the plane of line 2—2 on Fig. 1.

Fig. 5 is a horizontal transverse section in the plane of line 5—5 on Fig. 1.

Fig. 6 is a side elevational view of the rotor which is rotatably supported within the casing.

Fig. 7 is a substantially enlarged sectional view on the line 7—7 on Fig. 6.

Fig. 8 is an axial section of one of the combined intake and exhaust valves.

Fig. 9 is a section in the plane of line 9—9 on Fig. 8.

Figure 4:
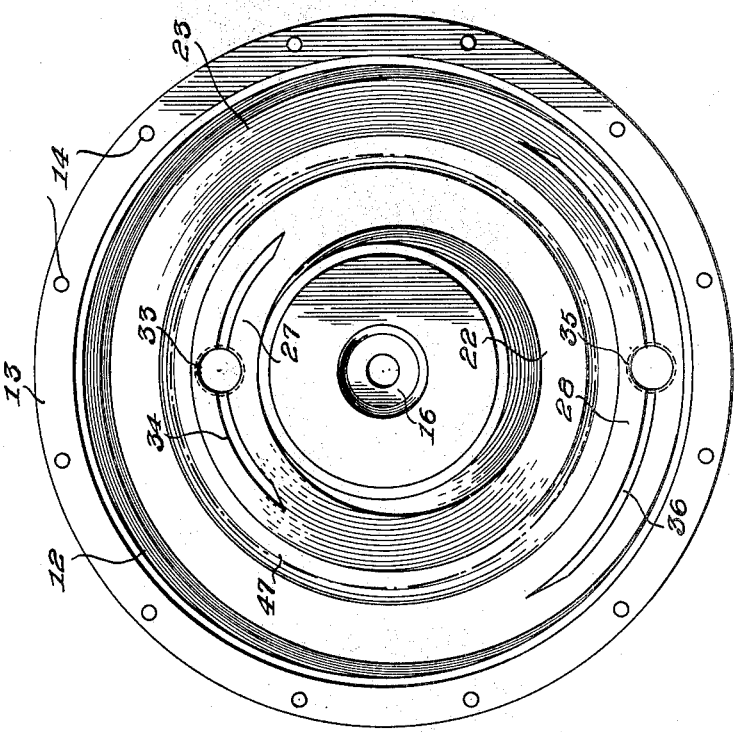
Fig. 4 is a similar view of the other cooperating casing section.

Referring now in detail to the drawings, 10 designates the engine casing which comprises a pair of cooperating sections 11 and 12.

The casing sections 11 and 12 include peripheral flanges 13 provided with aligning apertures 14 for receiving bolts 15 to draw and hold the sections together. The sections further include hubs 16 and the sections immediately outwardly of the hubs include disk portions 17 and 18 which, when the flanges 13 are in contact, are spaced apart a predetermined distance in the provision of a rotor disk receiving channel 19.

The casing section 11 is provided with inwardly facing inner and outer channels or cylinders 20 and 21 and the section 12 is provided with similar inner and outer channels 22 and 23.

These channels are each of substantially 360° but they are of maximum depth intermediate their ends at which latter points they merge into flat sealing surfaces with those on section 11 spaced from those on section 12 a distance equal to the width of channel 19.

Figure 3:
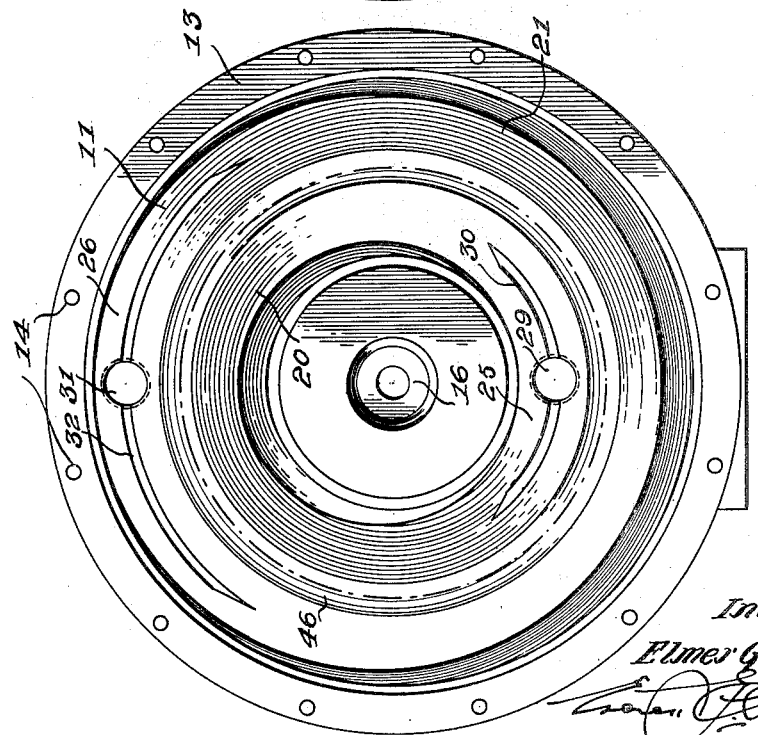
Fig. 3 is an inside elevational view of one of the casing sections.

Upon referring to Fig. 3 it will be seen that the inner channel 20 extends from a substantially flat surface 25 and the outer channel 21 extends from a substantially flat surface 26 and the surfaces 25 and 26 are diametrically disposed.

Upon referring to Fig. 4 it will be seen that the inner channel 22 extends from a substantially flat surface 27 and the outer channel 23 extends from a substantially flat surface 28.

From Figs. 3 and 4 as well as Fig. 2 it will be seen that the flat surfaces of the inner and outer channels 20 and 21 in casing section 11 are oppositely disposed relative to the flat surfaces 27 and 28 on casing section 12 and that the deepest portion of each channel in each section is laterally opposite a flat surface of a companion channel in the other section and that also the said flat surfaces are vertically alined.

Threaded apertures 29, 31, 33 and 35 are provided in the casing sections at said flat surfaces and in vertical alignment and said surfaces are respectively provided with arcuate slots 30, 32, 34 and 36 respectively and which slots communicate with the respective apertures 29, 31, 33 and 35 for a purpose later to appear.

A rotor 37 is rotatably supported within the casing 10 and between the sections 11 and 12 thereof.

The rotor comprises a disk 38 having a hub 39 rigidly connected to a shaft 40. This shaft is rotatably supported in the casing section hubs 16 to extend therethrough and therefore may be desirably extended for driving connection with any machine or part to be driven thereby.

The rotor disk 38 further includes an inner plane portion 41 having a snug fit in the channel 19 and an outer plane portion 42 disposed within the channels of the casing sections. The disk 38 further includes inner and outer sealing flanges 43 and 44 which seat within corresponding recesses in the casing at the radial inner and outer margins of the casing channels.

At this point it is to be observed that suitable gaskets or other sealing means will preferably be employed between the casing section flanges 13 and the flanges 43 and 44 and the walls of their corresponding recesses in order to provide the required and efficient chamber seals for the power source employed.

The body of the rotor disk 38 is formed intermediate the outer and inner plane portions with a circumferential bead 45 which is circular in cross section and which is supported to travel or slide in arcuate seats 46 and 47 in the casing sections 11 and 12.

The rotor 37 further includes a pair of diametrically opposed oscillatory pistons 48 and 49 which are pivotally supported on pivot pins 50 traversing gaps 51 in the bead 45 and adjacent plane portions 41 and 42 of the disk.

In view of the fact that the flat plate-like pistons 48 and 49 are disposed within the gaps 51 transversely of the plane of the rotor 37 and are rotatably supported on pins 50 spanning the gaps and having their opposite sides pivotally supported in the bead 45, provision is made for facilitating the assembly and dis-assembly of these pistons. To this end bearing blocks 52 are provided having opposed portions at opposite sides of each gap 51. As is clearly shown in Figs. 6 and 7 the blocks comprise elongated portions 53 removably seated in recesses in the bead and pivot pin retaining portions 54 between which the plate-like pistons 48 and 49 are disposed. With this means the blocks are removably secured to the bead by screws 55 extending through the elongated block portions 53 and the bead 45 as is more clearly shown in Fig. 7, where a piston 48 is also shown assembled in the bearing block parts, for pivotal movement in the gap 51 of the rotor 37 of Fig. 6.

The rotor disk 38 together with the bead 45 and the pistons 48 and 49 separate and seal the channels 20 and 21 in casing section 11 from the channels 22 and 23 in the casing section 12, which in effect provides four steam chambers or cylinders, two inner chambers (Fig. 2) C and $C^1$ and two outer chambers $C^2$ and $C^3$. Each of these chambers is of maximum depth toward such ends as is clearly indicated in Figs. 2, 3 and 4.

In operation an operating fluid such as steam is admitted to and exhausted from the chambers C, $C^1$, $C^2$ and $C^3$ by means of four valve assemblies 60, 61, 62 and 63 (Fig. 2) and each such valve assembly may be of the construction shown in detail in Figs. 8 and 9 wherein the valve is designated generally as 60. Each such valve assembly 60 includes a body portion 64 having an externally threaded tubular extension 65 for threaded engagement in one of the apertures 29, 31, 33 and 35 and an oppositely extending coaxial externally threaded tubular extension 66 for receiving a valve retaining nut 67.

An elongated bore 68 is provided within the body portion 64 and by the tubular extensions 65 and 66 in which is rotatably supported a valve member 69 having an operating stem 70 projecting outwardly of and beyond the extension 66.

A pair of diametrically disposed ports 71 is provided in the tubular extension 65 adjacent the free end thereof and such ports are adapted to communicate with slots 30, 32, 34 or 36 when the closed end of the extension is substantially flush with the corresponding flat surface 25, 26, 27 or 28.

The valve assembly further includes a pair of ports 72 which at adjacent ends thereof communicate with the bore 68 and which at their opposite ends communicate with internally threaded sockets 73 in the body portion 64 and conduit securing means 74 are threaded into the sockets 73.

The valve member 69 includes a central cylindrical portion 75 and opposite radially extending port blocking portions 76 defining steam or other working fluid chambers 77 within the valve body. Each valve assembly controls both the inlet and exhaust of steam to and from the corresponding steam chamber when the portions 76 are disposed between the ports 72, as in Fig. 9, but when the valve is in position of Fig. 8 the ports 72 are closed and accordingly steam can not be admitted.

With the valve turned to the position in Fig. 9 steam will enter the lower port 72 and exhaust out of the upper port 72, it being understood that the bore 68 is always in communication with the steam chamber through ports 71 and slots 30, 32, 34 or 36.

Upon rotation of the valve to the dotted position in Fig. 9 the ports 72 will be reversed in their function and the direction of rotation of the rotor will accordingly be reversed. The valve assemblies 60 to 63 may be connected by steam inlet conduits 78 for the inner steam chambers C and $C^1$, conduits 79 serving as exhaust conduits from such chambers and as inlet connections for the outer chambers $C^2$ and $C^3$ and exhaust conduits 80 for said outer chambers.

Suitable manual operating means may be provided for simultaneous operation of all the valves and such means may comprise lever arms 81 secured to the valve stems 70 and links 82 pivotally connected to such arms and extending upwardly for operative connection to a common operating means which may be supported by the casing 10.

It is to be noted that the casing section 11 may be provided with a supporting base 83. While the channels forming the steam chambers C, $C^1$, $C^2$, and $C^3$ each converge from a relatively deep central portion to a rotor disk contacting flat surface, the pair of inner channels 20, 22 and the pair of outer channels 21 and 23 each provide in effect a continuous channel of a cross sectional form corresponding to the shape of the piston wings. An inner circumferentially continuous channel is thus provided each having portions thereof on opposite sides of the rotor disk 38 in symmetrical relation therewith and due to the provision of the mounting of the pistons for oscillatory movement transversely of the rotor through the gaps or slot-like passages 51 wherein the wings of the pistons follow the channels throughout their circumferential extents.

At this point it is to be observed that the pistons 48 and 49 always have their wings 56 and 57 in the gaps or transverse passages 51 in the rotor disk whereby the steam chambers at one side of the rotor disk are at all times sealed off from those at the opposite side thereof.

In operation of the improved engine, steam is admitted into the valve assemblies 60 to 63 simultaneously by proper setting of the valves 69 and by which steam is admitted to one side or the other of the pistons 48 and 49 for forward or reverse rotation of the rotor 37 by the means above described.

Since the valves and steam admission and exhaust ports are disposed substantially in a diameter of the casing and the pistons 48 and 49 are disposed diametrically of the rotor disk 38, the piston wings will always traverse equal transverse areas of the steam chambers at opposite sides of the rotor disk. Thus upon consideration of Fig. 2 it will be seen that the inner wings 56 of the pistons are disposed at the central or deepest portions of the steam chambers C and C¹ or at points intermediate the flat surfaces 25 and 27. The outer wings 57 of the pistons are likewise disposed in the outer steam chambers C² and C³ and in this position of the rotor the inner wings are disposed at one side of the rotor disk and the outer wings at the opposite side thereof.

When the rotor has moved 90° from the position in Fig. 2, to that in Fig. 5 whereupon the pistons are disposed in a diameter at right angles to the line of valves, the piston wings 56 and 57 are equally divided by the rotor disk and are engaged in corresponding steam chambers at opposite sides of the disk. Thus it will be seen that the pistons always have a balanced relation with respect to the rotor disk and are subjected to equal pressures at opposite sides of the disk through the rotation of the rotor.

It should be appreciated from the above description that the improved engine is very simple in construction in that it comprises only a pair of casing sections, a rotor disk and a pair of oscillatory valves pivotally supported by the rotor disk together with a combined steam inlet and exhaust valve for each steam chamber in the casing.

Not withstanding the simplicity of the construction, the engine is highly efficient in operation due to the provision for rapid steam expansion in the steam chambers in which the wings of the oscillatory piston are disposed.

While I have disclosed my invention in accordance with a single structural embodiment thereof, such is to be considered as illustrative only, and not restrictive, the scope of the invention being defined in the sub-joined claims.

What I claim and desire to secure by U. S. Letters Patent is:

1. In a rotary engine, a casing comprising a pair of disk-like sections, a pair of inner and outer concentric channels in each section being of maximum depth at one side of the center of the section and decreasing in depth to relatively flat surfaces diametrically opposite said center of the section and the channels in one section being opposed to the corresponding channels in the other section in the provision of circumferentially continuous steam chambers of uniform cross section when the two casing sections are in face to face assembled relation, a rotor including a disk rotatably supported between the casing sections, and having diametrically opposed gaps therein, a piston pivotally supported in each of said gaps for oscillating movement relative to the disk in traversing the steam chambers disposed at opposite sides of the disk, a threaded bore in each said flat surface in communication with steam inlet and exhaust slots therein, and a combined inlet and exhaust valve structure threaded into each of said bores.

2. The structure according to claim 1 wherein said casing sections include hub sections having alined bores therein, said rotor disk including a hub disposed within the casing hub sections and having a bore therein aligned with said first bores, a shaft rotatably supported in the bores in the casing hub sections and secured within the bore in the disk hub, and said disk including inner and outer flanges seating in recesses in the casing sections at the inner and outer limits of said steam chambers.

3. The structure according to claim 1 wherein said casing sections are provided with cooperating circumferential arcuate seats, and wherein said rotor disk includes a circumferential bead rotatably supported in said seats and providing a steam seal between the inner and outer steam chambers, and said pistons being pivotally supported by pins traversing said gaps and having their ends disposed in said bead.

4. The structure according to claim 3 wherein each piston pivoting pin is supported in opposed blocks removably connected to the bead at opposite sides of the corresponding gap.

5. The structure according to claim 1 wherein said valve structure comprises a body member having an elongated bore, steam inlet and exhaust ports in said body member communicating with said bore diametrically thereof, ports in said body member communicating with said bore diametrically thereof and in right angular relation to said first ports, said second ports adapted for communication with said steam inlet and exhaust slots, and a rotary valve in said bore constructed to alternately effect communication between one of said first and second ports and the other of said first and second ports.

ELMER G. BARRETT.

REFERENCES CITED

The following references are of record in the file of this patent:

UNITED STATES PATENTS

| Number | Name | Date |
|---|---|---|
| 13,930 | Wright | Dec. 11, 1855 |
| 2,020,611 | Knapp | Nov. 12, 1935 |
| 2,090,280 | Bierman | Aug. 17, 1937 |
| 2,091,577 | Adler et al. | Aug. 31, 1937 |
| 2,154,457 | Knapp | Apr. 18, 1939 |